Aug. 8, 1950

E. WILDHABER 2,518,431

PROPELLER BLADE RETENTION

Filed June 18, 1946

INVENTOR
Ernest Wildhaber
BY
ATTORNEY

Aug. 8, 1950  E. WILDHABER  2,518,431
PROPELLER BLADE RETENTION

Filed June 18, 1946  2 Sheets-Sheet 2

INVENTOR.
Ernest Wildhaber
BY
ATTORNEY

Patented Aug. 8, 1950

2,518,431

UNITED STATES PATENT OFFICE 2,518,431

PROPELLER BLADE RETENTION

Ernest Wildhaber, Brighton, N. Y.

Application June 18, 1946, Serial No. 677,487

9 Claims. (Cl. 170—160.11)

This invention relates to variable pitch aircraft propellers and more particularly to a propeller blade retention therefor in which compensation for blade centrifugal twisting moments is provided.

In an application Serial No. 505,675, filed October 9, 1943, which matured into Patent No. 2,460,559 on February 1, 1949, there is disclosed a multiple cam and roller thrust bearing arrangement together with mechanism to maintain proper relationship between the rollers and cams, for causing a variable pitch propeller blade to move in varying increments along its axis as it is rotated to vary the pitch. The pitch of the cams vary to derive a blade turning moment from the blade centrifugal force which will oppose the twisting moment. The present invention is directed toward certain improvements relating to the simplification of the mechanism for maintaining a proper cam and roller relationship as well as alignment of the rollers.

It is an object of the present invention to provide in a propeller blade retention, means for maintaining cam engaging thrust rollers in proper angular relation with respect to such cams as well as alignment with the pitch varying axis of rotation of the propeller blade.

Another object of the invention is to provide aligning means for cam engaging rollers of the type described which shall be coaxial with the rollers and light in weight.

A further object of the invention is to provide aligning means for cam engaging rollers of the character described in which the rollers are provided with a spherical end adapted to engage a cylindrical blade socket wall to provide an aligning couple.

The above and other novel features of the invention will appear more fully hereinafter from the following detailed description when taken in conjunction with the accompanying drawings. It is expressly understood, however, that the drawings are employed for illustrative purposes only and are not designed as a definition of the limits of the invention, reference to the appended claims being had for this purpose.

Referring to the drawings, wherein like reference characters indicate like parts:

Figure 1:
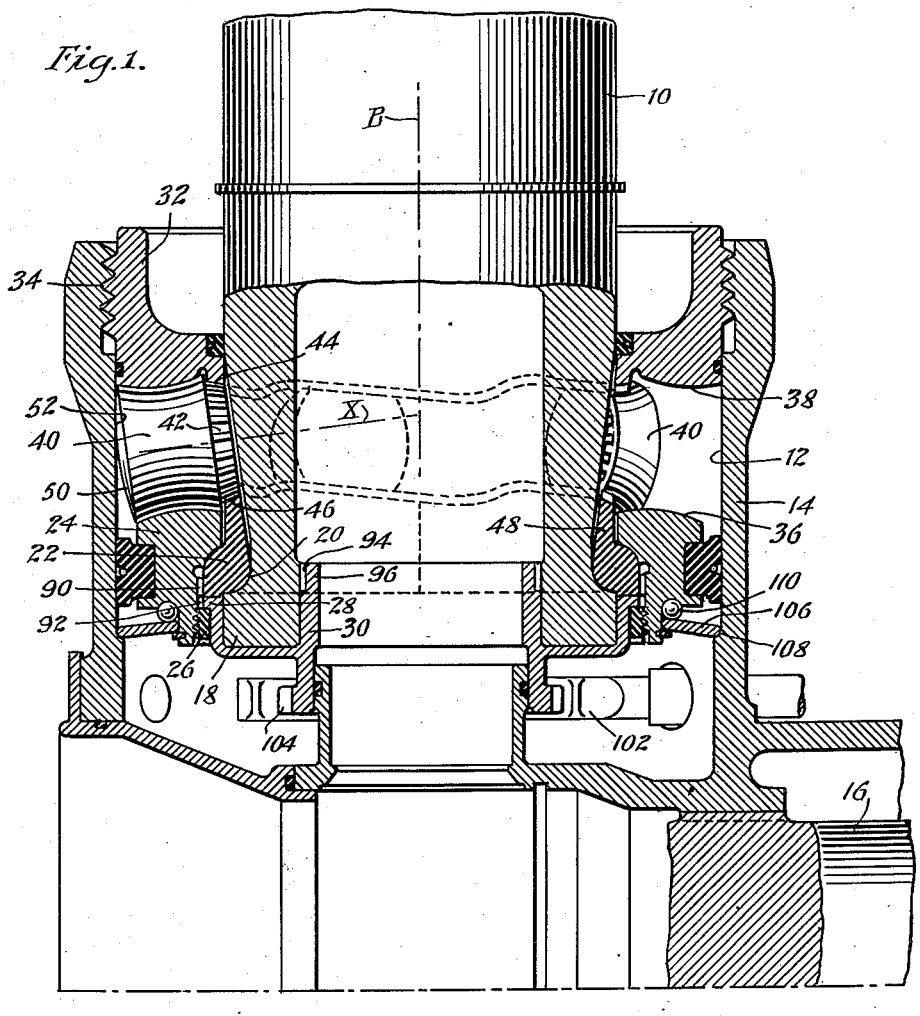
Fig. 1 is an axial section of a propeller hub and one of its blade retention sockets.

Referring to Fig. 1 it will be seen that there is provided a propeller blade shank 10 retained in a socket 12 formed integrally with the hub 14, which is suitably splined upon a propeller driving shaft 16. The shank of the blade 10 is flanged as at 18 by providing the annular groove 20 and a split ring 22 is positioned within such groove and surrounded by a cam thrust ring 24 adapted to bear against the flange 18, through the split ring.

The cam ring 24 has an internal diameter sufficiently large to slide over the blade shank shoulder. A threaded retaining ring 26 is threaded upon the inner side of the ring 24 and bears against a flange 28 of an annular cap member 30 positioned over the end of the blade shank.

The socket 12 is provided with a retention ring 32 threaded within the socket as at 34 and the facing shoulders formed by the ring 32 and the ring 24 are provided with convex cam surfaces 36 and 38 respectively which are held in spaced relation by a plurality of rollers 40. Where a pitch variation of about 120° is required, five equally spaced duplicate cams on each ring will be provided with five rollers.

The profile of the cams may be sinusoidal as described in the patent application above referred to and the rollers may be of the hour glass or concave type and cooperate with the convex surfaces of the cams 36 and 38. Such rollers would normally maintain their alignment with respect to the race ways or cams 36 and 38 except for the inclination of the cams which provide a twisting moment tending to move the roller axis away from intersecting relationship with the pitch changing axis of rotation of the blade shank. Also the limited friction inherent in hour glass rollers of the type shown tends to cause such rollers, when operating upon cams and subjected to vibration, to seek the low point of such cams. The rollers may be canted as shown to provide self-centering characteristics.

Figure 4:
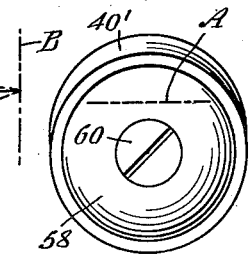
Fig. 4 is an end view of the roller shown in Fig. 3.

Correct angular disposition of the rollers with respect to their respective cams 36 and 38 is maintained so that each may bear an equal share of the blade thrust, and impart an axial movement of the blade from which a turning moment is derived adapted to oppose and neutralize the blade twisting moment at any particular blade angle. For this purpose, each roller is provided with a bevel gear 42 interengaging with toothed flanges 44 and 46 upon the retaining ring 32 and upward extension 48 on the split ring 22. The pitch line of the teeth on each flange is such as to follow the cam profile and forces the rollers, when once correctly positioned, to maintain a proper angular relation with respect to the profiles of the cam rings 32 and 36 as the blade is rotated within its socket. While the bevel gear of each roller maintains the inner face of such roll correctly positioned, the tendency of the roller to twist so that its axis fails to intersect the blade shank axis, may require additional means to maintain alignment. To assure proper alignment in this respect at all times the roll 40 is provided with a spherical end face 50 which is adapted to bear against a cylindrical wall 52 forming the inside surface of the socket 12. By reason of the corresponding radius of the cylindrical surface 52 and the spherical surface 50 a couple extending for example along the length of the line of contact beween sphere and wall (indicated at A, Fig. 4) is provided to retain the axis of the roll 40 in substantially intersecting relationship to the blade axis, indicated at B.

Figure 2:
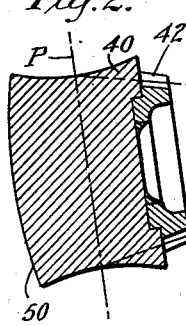
Fig. 2 is a sectional view of one form of roller employed in Fig. 1.
Figure 3:
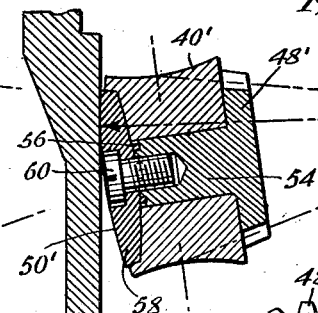
Fig. 3 is a transverse section through a modified form of roller and a portion of the socket in engagement therewith to illustrate the principle of the invention.
Figure 5:
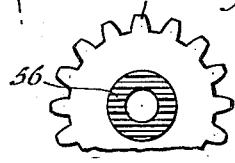
Fig. 5 is an elevation view of the roller aligning element shown in Fig. 3.

In the modification of Fig. 2 the pitch circle of the bevel gear 42 lies upon a cone C whose apex normally lies at the blade shank center line B and the cone also intersects the concave surface of the roller in a plane P transverse to the roller axis and passing through substantially the minimum diameter portion of such roller. Such relationship as has been described is a requirement where the bevel gear 48 and the roller 40 are integrally secured to one another as is shown in Fig. 2. The relationship, however, may be other than that described in the form shown in Fig. 3 since the bevel gear as shown therein is permitted to rotate relative to the roller 40'. In the form shown in Fig. 3 the bevel gear 40' is provided with a shank 54 extending and freely rotating in a bore in the roll 40'. The end of the shank is serrated or corrugated as at 56 to receive a complementary serrated end button 58 secured to the stem 54 by a screw 60. The outer face of the button 58 has a spherical surface 50' corresponding in radius to the radius of the cylindrical wall of the socket as heretofore described in connection with the roller of Fig. 2. In this modification the gear and roller may rotate relative to one another, and it is not essential that the pitch circle cone of the gear 48' intersect the roller at its minimum diameter.

Figure 6:
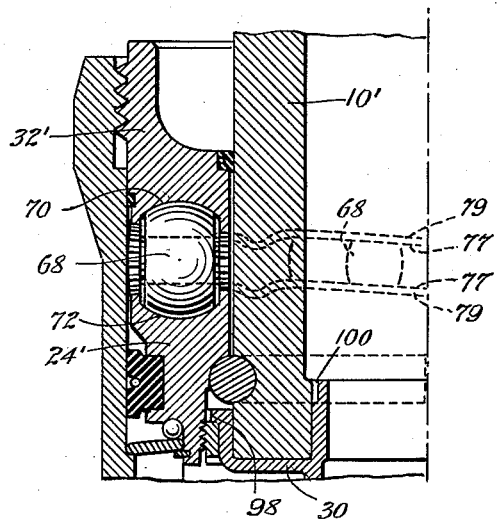
Fig. 6 is an axial section taken through a modified form of hub and one of its blade retention sockets.
Figure 7:
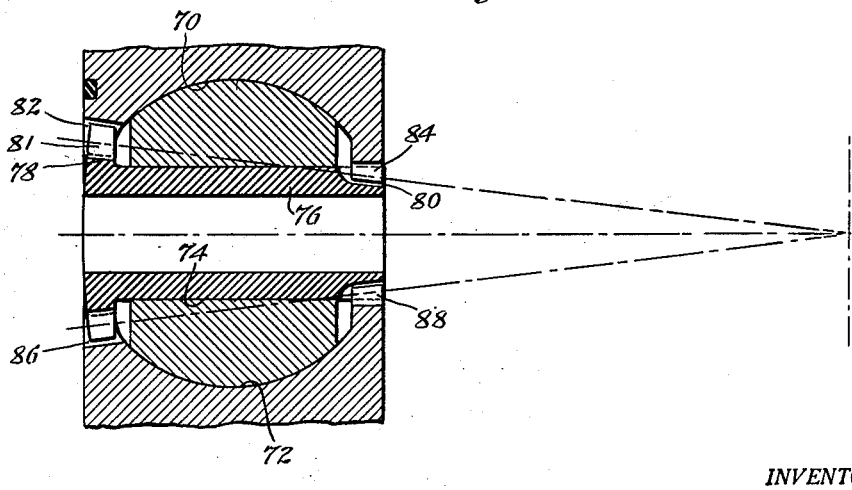
Fig. 7 is an enlarged sectional view of the roller and cooperating cam ways of Fig. 6.

In the modification of Fig. 6, spherical rollers 68 are employed, rolling in concave cam ways 70 and 72 formed in the retaining ring 32' and shank ring 24'. Such spherical roll has little if any self-aligning tendency and as shown in Fig. 7 is provided with an aperture 74 through which an aligning thimble 76 extends. The aligning thimble is provided with a flange 78 at its outer end having teeth 81, and has teeth 80 milled on the outer surface at its inner end. The teeth of flange 78 and the milled teeth are such as to lie upon a common pitch cone whose vertex lies at the center of rotation of the blade shank and such teeth mesh with internal and external rack teeth arranged upon either side of the cam ways 70 and 72 formed in flanges 82, 84, 86 and 88. Through interengagement of the teeth at either end of the thimble 76 with the teeth formed on the flanges adjacent the cam ways 70 and 72, accurate alignment of the axis of the thimble and of the roller 68 in intersecting relation with the shank axis is maintained. The pitch lines 77 and 79 for the rack teeth follow the cam profiles as indicated.

In the modification of Fig. 1 the angular relationship between split ring 22 and the blade shank 10 is maintained together with the angular relation of the ring 36 by means of interengaging splines 90 between the split ring 22 and the cam ring 24 and splines 92 between the cam ring 24 and the annular cap flange 28 and splines 94 between the internal wall of the blade shank and an interior upward extension 96 of the shank end cap 30. The annular relationship between the cam ring 24' and the shank 10' of Fig. 6 is similarly maintained through a splined connection 98 between the end cap 30 and the ring 24' and splines 100 between the shank 10' and cap 30.

It will be understood that any suitable mechanism may be employed to effect changes of pitch of the blade within its socket, as for example a reciprocating rack acting upon teeth 104 integral with the blade cap 30. It will also be understood that the blade is preferably pre-loaded in the socket by a suitable resilient spring ring such as 106 bearing upon a shoulder 108 in the blade socket and an anti-friction bearing 110 seated in the lower face of the cam ring 24'.

Though several embodiments of the invention have been illusrated and described, it is to be understood that the invention is not limited thereto but may be embodied in various modifications and arrangements which may be made without departing from the spirit of the invention, as will be apparent to those skilled in the art. Accordingly, reference will be had to the appended claims for a definition of the limits of he invention.

I claim:

1. In a variable pitch propeller, a hub having a blade retention socket, a blade having its shank extending into said socket, means for swivelly retaining said shank within said socket and for axially moving said blade upon swivelling comprising, opposed relatively movable cam ways substantially rigid with said socket and shank respectively and rollers interposed therebetween, means for retaining the angular relationship between the axes of the rollers and said cam ways fixed for any relative position between said blade and hub, said means comprising a toothed member coaxial with and freely rotatable with respect to each roller, and teeth upon each of said opposed ways engaging said toothed member.

2. In a variable pitch propeller, a hub having a blade retention socket, a blade having its shank extending into said socket, means for swivelly retaining said shank within said socket and for axially moving said blade upon swivelling comprising, opposed relatively movable cam ways substantially rigid with said socket and shank respectively and rollers interposed therebetween, means for retaining the angular relationship between the axes of the rollers and said cam ways fixed for any relative position between said blade and hub, said means comprising a toothed member coaxial with and freely rotatable with respect to each roller, teeth upon each of said opposed ways engaging said toothed member arranged on a pitch line which is displaced axially to substantially conform with the axial displacements of said cam ways, and means outwardly of said rollers to stabilize them to maintain their axes in intersecting relation with said blade shank swivelling axis.

3. In a variable pitch propeller, a hub having a blade retention socket, a blade having its shank extending into said socket, means for swivelly retaining said shank within said socket and for axially moving said blade upon swivelling comprising opposed relatively movable cam ways substantially rigid with said socket and shank respectively and rollers interposed therebetween, means for retaining the angular relationship between the axes of the rollers and said cam ways fixed for any relative position between said blade and hub, said means comprising a toothed member coaxial with and freely rotatable with respect to each roller, and teeth upon each of said opposed ways engaging said toothed member, arranged on a pitch line which is displaced axially to substantially conform with the axial displacements of said cam ways.

4. In a variable pitch propeller, a hub having a socket and a blade rotatable therein for pitch change, a blade retention holding said blade in said socket comprising a thrust bearing having opposing race ways, and thrust rolls between and in engagement therewith, said race ways constituting a series of circular cams secured on said socket and on said blade respectively, the profile of the cams corresponding substantially with a portion of a sine wave, the angular length of each sine wave being double the angular range of pitch variation, a gear coaxial with each of said rolls and rotatable relative thereto, and crown teeth substantially rigid with said ways meshing with said gears for angularly positioning said rollers circumferentially of said race ways, said rollers, when said blade is at approximately 45° pitch, engaging opposed cams at points on the slope thereof where the slope is maximum.

5. In a variable pitch propeller, a hub, a blade swivelly retained thereon, means for causing radial movement of said blade with respect to the hub axis upon swivelling of said blade with respect to said hub including a plurality of pairs of cams, one cam of each pair having opposed relation to the other, a thrust roller engaging the opposed cams of each pair, one of said cams being secured to the hub and not rotative with respect to the swivelling of said blade, and the other being fixed for rotation with the swivelling blade, said hub having an internal cylindrical wall coaxial with the swivelling axis of said blade, a spherical end face on each roller of a radius substantially that of the cylindrical wall adapted to engage said wall, and thereby have its axis constrained to lie in a plane passing through the swivelling axis, and timing means coaxial of the roller and engaging complementary means fixed with respect to said cams, to fix the angular position of the roller axis with respect to the opposed cams in engagement therewith.

6. In a variable pitch propeller, a hub, a hub socket having a cylindrical internal wall, a blade having a shank, an internal socket flange, and an external shank flange, convex cam ways upon said flanges opposing one another and concave rollers engaging said ways, gear teeth fixed with respect to said flanges having pitch circles corresponding to said cam ways, a coaxial toothed wheel rotatably carried by each of said rolls inwardly thereof meshing with said flange gear teeth, and a spherical end face for each of said rolls bearing against said cylindrical wall.

7. In a variable pitch propeller, a hub, a hub socket having a cylindrical internal wall, a blade having a shank, an internal socket flange, and an external shank flange, convex cam ways upon said flanges opposing one another the cam way on said socket flange being of slightly greater diameter than the cam way on said shank flange, and canted concave rollers engaging said ways, gear teeth fixed with respect to said flanges having pitch circles corresponding to said cam ways, a toothed wheel carried by each of said rolls inwardly thereof meshing with said flange gear teeth, and a spherical end face for each of said rolls bearing against said cylindrical wall.

8. In a variable pitch propeller, a hub, a hub socket, a propeller blade shank in said socket adapted for swivelling along the shank axis, an internal flange on said socket, an external flange on said shank, cam ways on said flanges and rollers therebetween for moving said blade axially thereof upon rotation, a gear at least on one side of each roller and coaxial therewith and rotatable relative thereto, having a pitch circle lying on a cone having its apex on said axis, and a toothed flange on each of said cam ways for engaging said gears.

9. In a variable pitch propeller including a hub having a blade retention socket and a blade having its shank extending into said socket; means for swivelly retaining said shank within said socket and for axially moving said blade upon swivelling comprising opposed relatively movable cam races drivably secured to said socket and shank respectively, rollers interposed between said races, and means for retaining the angular position between the axes of said rollers and said races in a certain relationship for each relative swivel position between said blade and hub, said means comprising a toothed member coaxial with each roller, and teeth rigid with each of said opposed races engaged with said toothed member.

ERNEST WILDHABER.

REFERENCES CITED

The following references are of record in the file of this patent:

UNITED STATES PATENTS

| Number | Name | Date |
|---|---|---|
| 715,171 | Stilson | Dec. 2, 1902 |
| 1,161,970 | Pulliam | Nov. 30, 1915 |
| 1,646,947 | Armstrong | Oct. 25, 1927 |
| 1,829,443 | Gobereau, et al. | Oct. 27, 1931 |
| 1,887,543 | Chilton | Nov. 15, 1932 |
| 1,973,573 | Lougheed | Sept. 11, 1934 |
| 2,020,239 | Coats | Nov. 5, 1935 |
| 2,460,559 | Wildhaber | Feb. 1, 1949 |

FOREIGN PATENTS

| Number | Country | Date |
|---|---|---|
| 95,613 | Sweden | Mar. 2, 1939 |
| 336,479 | Great Britain | Oct. 16, 1939 |